United States Patent
Bergman et al.

(10) Patent No.: US 8,307,357 B2
(45) Date of Patent: *Nov. 6, 2012

(54) METHODS AND APPARATUS FOR CUSTOMIZING USER-INTERFACE CONTROL IN EXISTING APPLICATION

(75) Inventors: Lawrence D. Bergman, Mount Kisco, NY (US); Vittorio Castelli, Croton-on-Hudson, NY (US); Tessa A. Lau, New York, NY (US); Daniel A. Oblinger, New York, NY (US)

(73) Assignee: International Business Machines Corporation, Armonk, NY (US)

( * ) Notice: Subject to any disclaimer, the term of this patent is extended or adjusted under 35 U.S.C. 154(b) by 1149 days.

This patent is subject to a terminal disclaimer.

(21) Appl. No.: 12/058,146

(22) Filed: Mar. 28, 2008

(65) Prior Publication Data

US 2008/0178083 A1     Jul. 24, 2008

Related U.S. Application Data

(63) Continuation of application No. 11/831,365, filed on Jul. 31, 2007, now Pat. No. 8,046,754, which is a continuation of application No. 10/697,752, filed on Oct. 30, 2003, now Pat. No. 7,890,948.

(51) Int. Cl.
*G06F 9/44*     (2006.01)
*G06F 9/445*    (2006.01)
*G06F 17/00*    (2006.01)
*G06F 17/20*    (2006.01)

(52) U.S. Cl. ............. 717/174; 717/105; 706/11; 706/45

(58) Field of Classification Search ........................ None
See application file for complete search history.

(56) References Cited

U.S. PATENT DOCUMENTS

| | | | |
|---|---|---|---|
| 6,606,744 B1 * | 8/2003 | Mikurak | 717/174 |
| 6,854,112 B2 * | 2/2005 | Crespo et al. | 717/174 |
| 7,712,074 B2 * | 5/2010 | Ren | 717/105 |
| 7,739,608 B2 * | 6/2010 | Fujishita | 715/744 |
| 7,890,948 B2 * | 2/2011 | Bergman et al. | 717/174 |
| 8,046,754 B2 * | 10/2011 | Bergman et al. | 717/174 |
| 2002/0087496 A1 * | 7/2002 | Stirpe et al. | 706/45 |
| 2002/0116349 A1 * | 8/2002 | Batachia et al. | 706/11 |
| 2004/0107414 A1 * | 6/2004 | Bronicki et al. | 717/105 |

OTHER PUBLICATIONS

"Mixed Initiative Interfaces for Learning Tasks: SMARTedit Talks Back", Wolfman et al., 2001, pp. 1-8, <http://www.cs.washington.edu/homes/pedrod/papers/iui01.pdf>.*
Schwarzkopf et al., Exploiting visual information in programming by demonstration, Jan. 2002, 2 pages, <http://delivery.acm.org/10.1145/510000/502766/p220-schwarzkopf.pdf>.*

(Continued)

*Primary Examiner* — Thuy Dao
(74) *Attorney, Agent, or Firm* — Derek S. Jennings; RYan, Mason & Lewis, LLP

(57) ABSTRACT

Techniques for altering application user-interface controls are provided. More particularly the customization of a new or existing user-interface control in an application user-interface is provided. In one aspect of the invention, a method for customizing user-interface controls of an existing application comprises the recording of a procedure description performed by a user in the application user-interface. A new or modified application user-interface control relating to the procedure description is then installed in the existing application.

27 Claims, 5 Drawing Sheets

OTHER PUBLICATIONS

Myers et al., Programming by example: intelligence in demonstrational interfaces, Mar. 2000, 8 pages, <http://delivery.acm.org/10.1145/340000/330545/p82-myers.pdf>.*

Lau et al., Learning programs from traces using version space algebra, Oct. 2003, 8 pages, http://delivery.acm.org/10.1145/950000/945654/p36-lau.pdf>.*

* cited by examiner

METHODS AND APPARATUS FOR CUSTOMIZING USER-INTERFACE CONTROL IN EXISTING APPLICATION

CROSS-REFERENCE TO RELATED APPLICATION(S)

This application is a continuation of U.S. application Ser. No. 11/831,365 filed on Jul. 31, 2007, the disclosure of which is incorporated herein by reference. U.S. application Ser. No. 11/831,365 is a continuation of U.S. application Ser. No. 10/697,752 filed Oct. 30, 2003.

FIELD OF THE INVENTION

The invention relates to application user-interface controls and, more particularly, to the customization of new or existing user-interface controls in an application user-interface.

BACKGROUND OF THE INVENTION

In order to extend the functionality of existing applications several techniques have been proposed that allow an end-user to create a new control for the application user-interface. The user actions associated with the new control may be scripted by the user through a special-purpose scripting language within the application.

An application that permits control configuration in an existing application can be utilized by third-party developers, and can be provided as a package to be installed at the discretion of an end-user. For example, the Google search engine uses a toolbar having a set of controls, specified in JavaScript, that invokes extension mechanisms within browsers, such as Internet Explorer or Netscape. If the user chooses to install the toolbar into the browser, the JavaScript creates a new set of controls within an existing toolbar of the browser or hosting application.

There also exist application programs that install controls within other applications. An example of such a control is the Watson system developed at Northwestern University. As part of its installation, Watson adds new controls to several other application programs, including Internet Explorer and Microsoft Word. These controls are configured by the Watson developers and are added only to a small set of known programs. The developers of Watson have explicitly coded the actions that are to be associated with each control.

While the above mentioned approaches introduce the ability to extend the functionality of existing applications, they fail to provide a methodology that allows for the installation of any new or modified control into any existing application to suit a specific user. Thus, a need exists for an improved system for customizing a new or existing user interface control in an application.

SUMMARY OF THE INVENTION

The present invention provides techniques for altering application user-interface controls and, more particularly, for customizing a new or existing user-interface control in an application user-interface.

For example, in one aspect of the invention, a method for customizing a user-interface control in an existing application comprises the following steps. First, a procedure performed by a user in the application user-interface is recorded. Then, a new or modified application user-interface control relating to the recorded procedure is installed in the existing application.

Advantageously, the inventive technique described in the present invention goes beyond the existing systems in at least three ways. First, the inventive technique may allow for the installation of new controls into any existing application, not just a single application or a predefined set of applications. Second, the methodology may provide a uniform method of specifying the procedure that is bound to a new control. Rather than applying idiosyncratic techniques for each application, the user may simply demonstrate the new procedure exactly as they would perform it within that application. Third, the inventive technique allows not only the addition of new controls to existing applications, but also the remapping of existing controls, allowing users to modify their functionality.

These and other objects, features and advantages of the present invention will become apparent from the following detailed description of illustrative embodiments thereof, which is to be read in connection with the accompanying drawings.

DETAILED DESCRIPTIONS OF THE PREFERRED EMBODIMENT

The following description will illustrate the invention using an exemplary data processing system architecture. It should be understood, however, that the invention is instead more generally applicable to any data processing system in which it is desirable to perform efficient and effective customization of application interface controls.

As will be illustrated in detail below, the present invention introduces techniques for altering user-interface controls of an application and, more particularly, for customizing a new or existing user-interface control in an application user-interface. Generally, an application refers to a computer program designed for a specific task or use.

This invention comprises a software component that communicates with the operating system, capturing and delivering user events, such as keyboard clicks and mouse movements. This component can be thought of as a proxy, sitting between the operating system and the application. Procedures are recorded by capturing these low-level events as well as information about where application controls are located. This enables the recording component to make inferences about what components within the application have been activated.

Once a procedure has been recorded, it may be mapped to a new application control. Messages may be sent to the application through operating system application programming interfaces (APIs), instructing the application to insert a new control. The proxy receives notification when the control is activated, executes its recorded procedure, and generates the stream of user actions that would have been generated by the user actually activating these controls. In a similar fashion, the proxy can trap events on existing controls, and execute a procedure mapped to that control.

Figure 1:
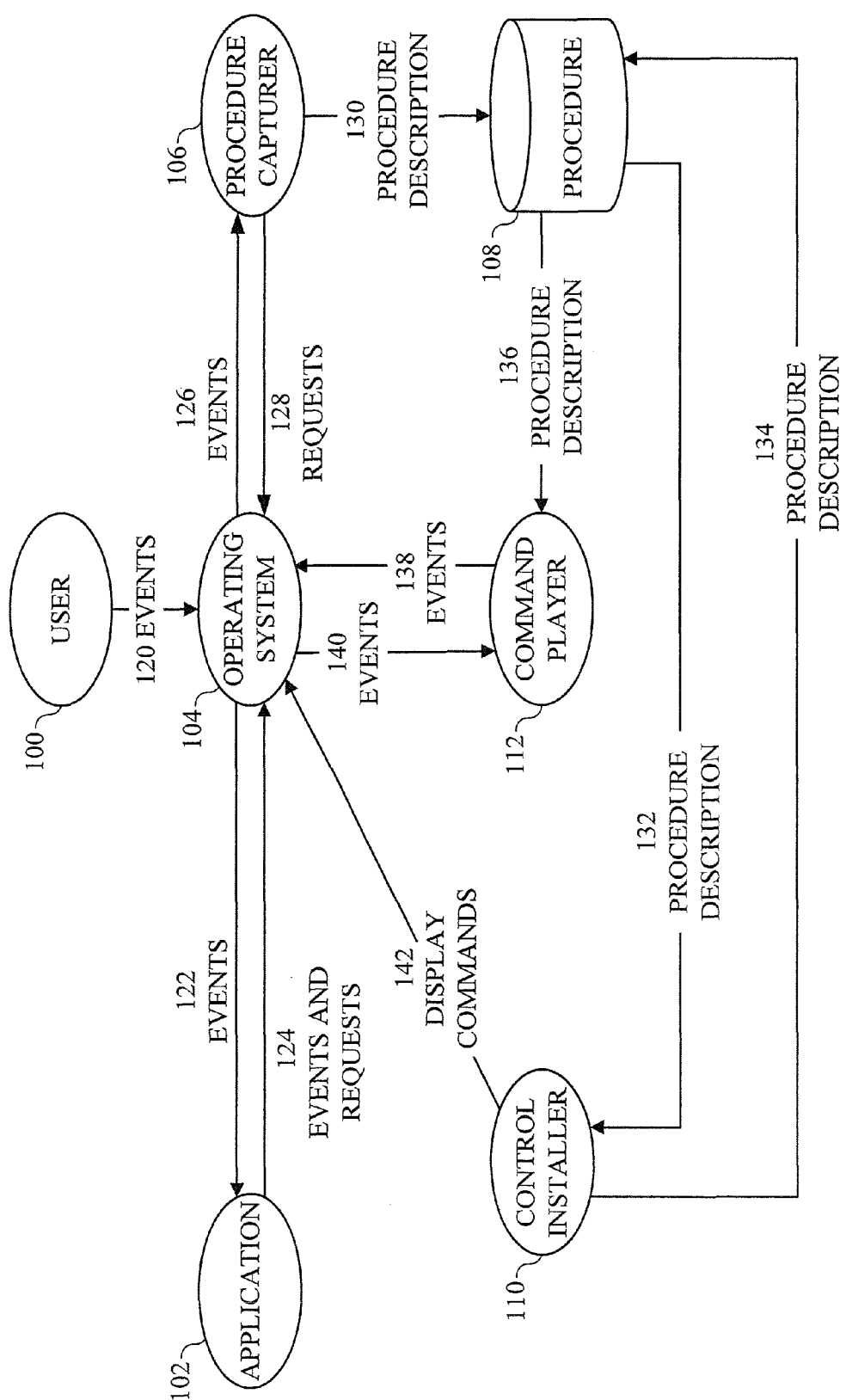
FIG. 1 is a block diagram illustrating procedure demonstration and procedure binding in an application user-interface, according to an embodiment of the present invention.

Referring initially to FIG. 1, a block diagram illustrates procedure demonstration and procedure binding in an application user-interface, according to an embodiment of the present invention. A user 100 interacts with an application 102 through computer input techniques, such as the clicking of a mouse and the pressing of keys. These actions create events 120 that are captured by an operating system 104. Within operating system 104, events 120 may be translated into higher-level events 122, which are then passed to application 102. For example, the events of pressing down on the button of a mouse, releasing the button, then repeating, can be translated into the higher-level event of a double click.

A procedure capturer 106 registers 128 with the operating system 104 in order to receive notification 126 of the events 122 that are passed to application 102. Most modern operating systems facilitate the setting of "hooks," which are callback registrations for particular types of events, see, e.g. Microsoft Windows.

In accordance with the invention, the application may also create events in addition to the user-initiated events. Application events 124 are passed to operating system 104 along with requests for system actions. These system actions may include the creation of new windows or controls, the deletion of windows or controls, or the changing of the visual representation of on-screen components. Procedure capturer 106 requests 128 to be notified of application events 124 as well. If the requests (hooks) 128 are set prior to the creation of a first application window, the procedure capturer can build a complete model of all on-screen entities (windows, controls) created by the application simply by capturing all the application-initiated events. Alternatively, requests 128 may be sent to operating system 104 for information about on-screen entities that have been created by application 102 at some point after application 102 has created them. Request 128 may be for all on screen entities, followed by a filtering of those entities not created by the application of interest. Hybrid approaches are also possible.

Events 126 of a specific procedure captured in the procedure capturer define a procedure description 130, which can be stored in a procedure repository 108.

A control installer component 110 is responsible for retrieving procedure descriptions 132 from procedure repository 108 and binding them to new or modified controls within application 102. This is accomplished by sending commands 142 to operating system 104, instructing operating system 104 to create and add the new controls or modify existing controls. An example of the creation of a new control is the addition of a new button to an existing toolbar within application 102. Modern operating systems typically provide APIs that facilitate creating and adding new controls in this manner. In addition to creating and registering the new control, control installer 110 will add additional information modifying procedure description 132 and creating procedure description 134 containing details of the new control, such as its location and type. Procedure description 134 is returned to procedure repository 108.

In accordance with the invention, the new or modified control will typically have a callback function associated with it. This callback may be a section of code within a command player 112. Command player 112 retrieves procedure description 136 from procedure repository 108. When an activation event 140 is received from operating system 104, as a result of the user having activated the newly installed control, command player 112 executes procedure description 136. As it executes, a series of events 138 are generated and sent to operating system 104. These events simulate what the user would have done if she had activated the controls that were recorded during the recording phase. In effect, command player 112 is replaying the recorded procedure. The events that are sent to operating system 104 are automatically passed on to application 102, and the desired procedure is carried out by application 102.

Figure 2:
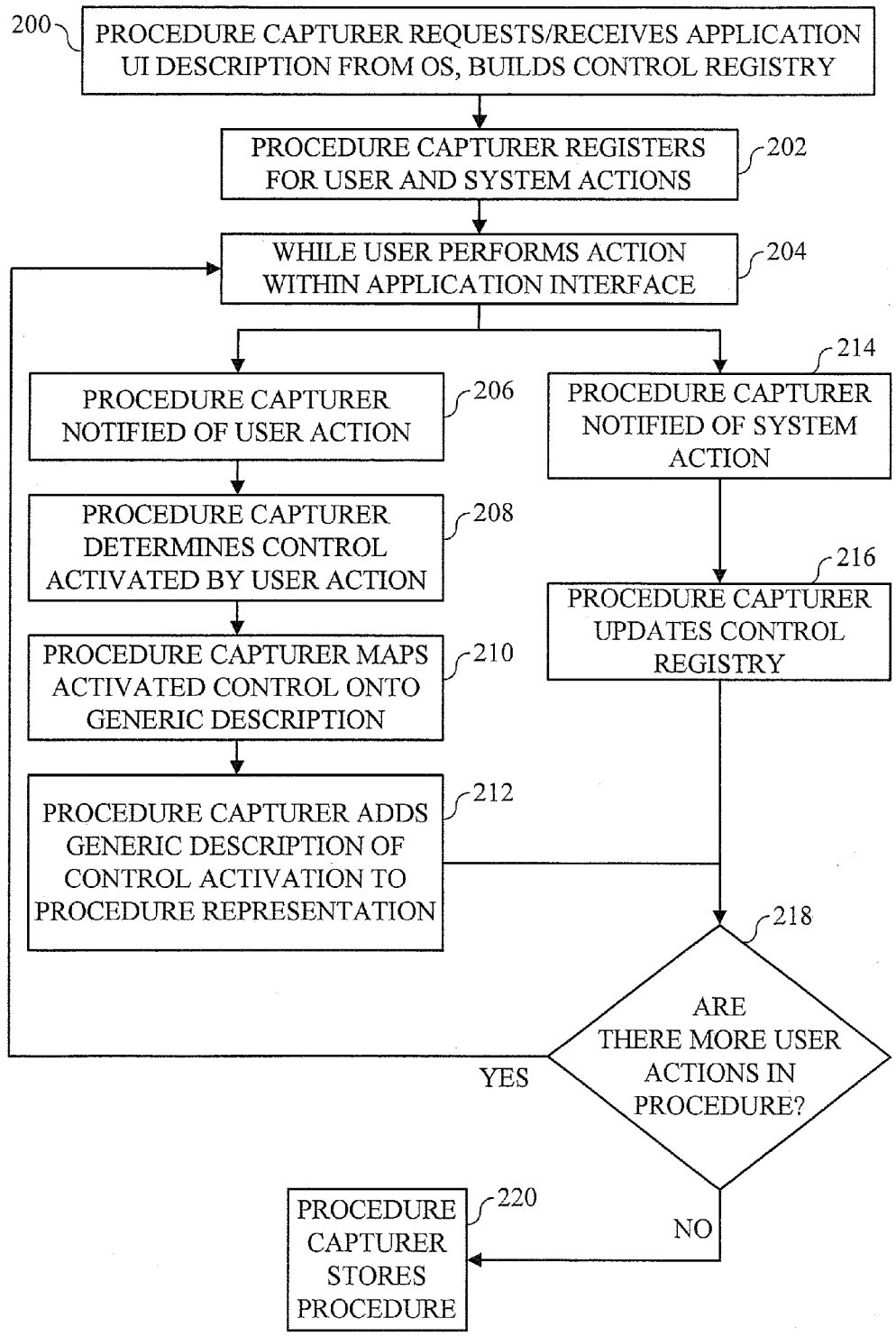
FIG. 2 is a flow diagram illustrating a recording procedure methodology, according to an embodiment of the present invention.

Referring now to FIG. 2, a flow diagram illustrates a recording procedure methodology, according to an embodiment of the present invention. This may be considered a detailed description of the interaction of user 100, operating system 104, application 102, and procedure capturer 106 in FIG. 1. Once the user has specified that a new control is to be created or modified, the procedure capturer requests and receives an application user-interface description from the operating system in step 200. This description contains all of the information on application controls that will be required for determining which controls have been activated when user events are received. This information also includes information on spatial location and type of control. The description may result from a single request, or from a series of requests. The exact structure of the requests will depend on the operating system API. For example, there may be a request for all root windows followed by requests for children of each root window. The procedure capturer uses the application user-interface description to create a control registry—a data structure that contains the relevant information about each application control. The control registry can be structured in a number of ways, including a hierarchical tree representation, a linked list, and a table.

After receiving the description at the procedure capturer, the procedure capturer registers with the operating system in order to receive notification of certain types of user and system actions in step 202. The user actions are those that are performed during demonstration of the procedure, such as mouse clicks and key presses. The system actions are those that affect the application interface during the demonstration, such as new control creation and control deletion.

The methodology then enters an iterative loop. In step 204, the user demonstrates actions of a procedure. A user action may be received at the procedure capturer in step 206. The procedure capturer then determines which control has been activated and the details of that activation in step 208. This is accomplished by using information in the user event or action, such as screen location, in conjunction with the control registry for the specific application. The identity of the control being activated and detail information, such as which item in a selection list has been chosen, is determined. Once the control activation information is determined, a generic description of the control activation is mapped in step 210. For example, a specification based on identity would be used such as "Press the Add button contained within the Admin control panel contained within the top-level window labeled 'user preferences.'" The generic control activation information is then added to a procedure representation in step 212. The procedure representation contains an entry for each user action, specifying which control has been activated, and the details of the activation including, for example, items selected and text typed.

If a system event, such as control creation is received in step 214, the Procedure Capturer uses that information to update its control registry in step 216. This is particularly important when an application creates new controls during execution, for example, pop-up menus. In practice, steps 214 and 216 might run in a separate thread, with appropriate synchronization mechanisms implemented to prevent access conflicts on the control registry.

Once the event has been processed, the procedure capturer checks to see if more user actions are to be recorded in step 218. In general, procedures will be recorded until the user pushes a "stop" button, or otherwise signals the end of procedure recording. If there are more user actions, the methodology returns to step 204. If there are no more user actions, the procedure capturer stores the procedure in step 220. This often occurs in a persistent medium such as a file on hard disk or data structures in main memory. Finally, a variety of graphical user interfaces allow the user to select the style and placement of the control to be installed during the recording process. For example, a control may be installed as a tool bar button or a menu item.

Figure 3:
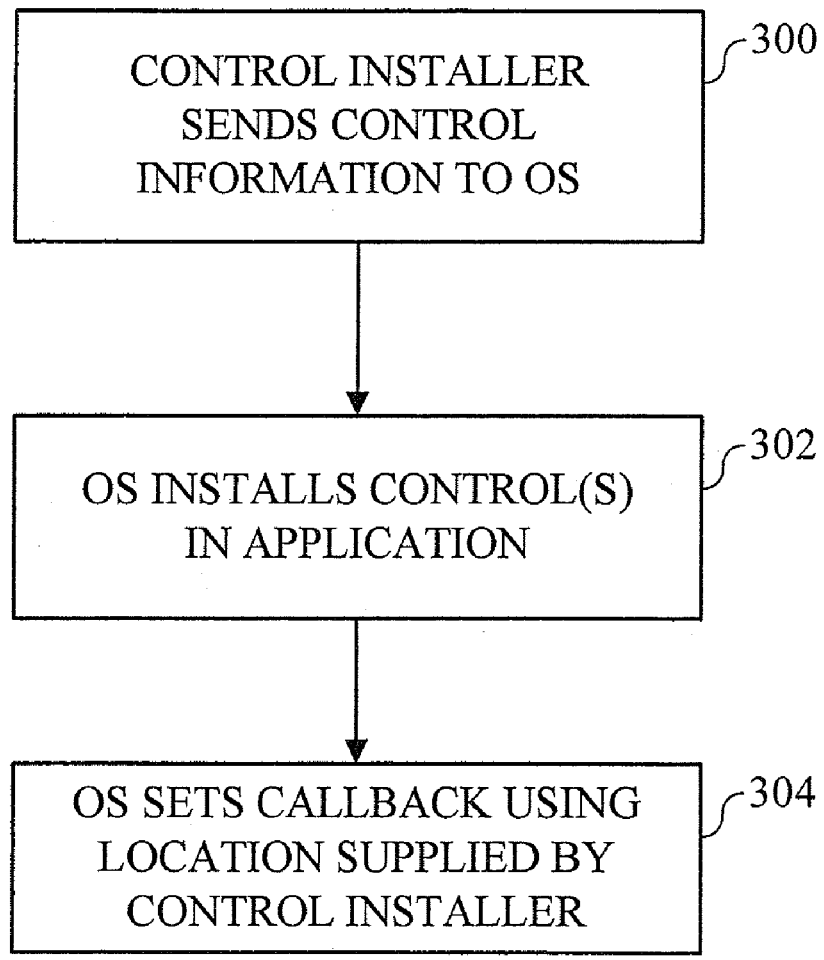
FIG. 3 is a flow diagram illustrating a procedure control installation methodology in an application user-interface, according to an embodiment of the present invention.

Referring now to FIG. 3, a flow diagram illustrates a procedure control installation methodology in the application user-interface, according to an embodiment of the present invention. This may be considered a detailed description of the interaction between control installer 110, operating system 104, and application 102 in FIG. 1. A control installer first sends a request to the operating system to install the new control or modify the existing control in step 300. For example, the request may be to add a new button to an existing toolbar within the application, to add a new toolbar containing a new button to the top-level application window, or to add a new item to an existing menu within the application interface.

The installation request contains a callback routine location and/or other activation information that will be required to actually run the procedure. Using this information, the operating system creates the new control, and installs it in the application user-interface in step 302. Additionally, the operating system registers the callback in step 304, using the location supplied by the control installer.

Figure 4:
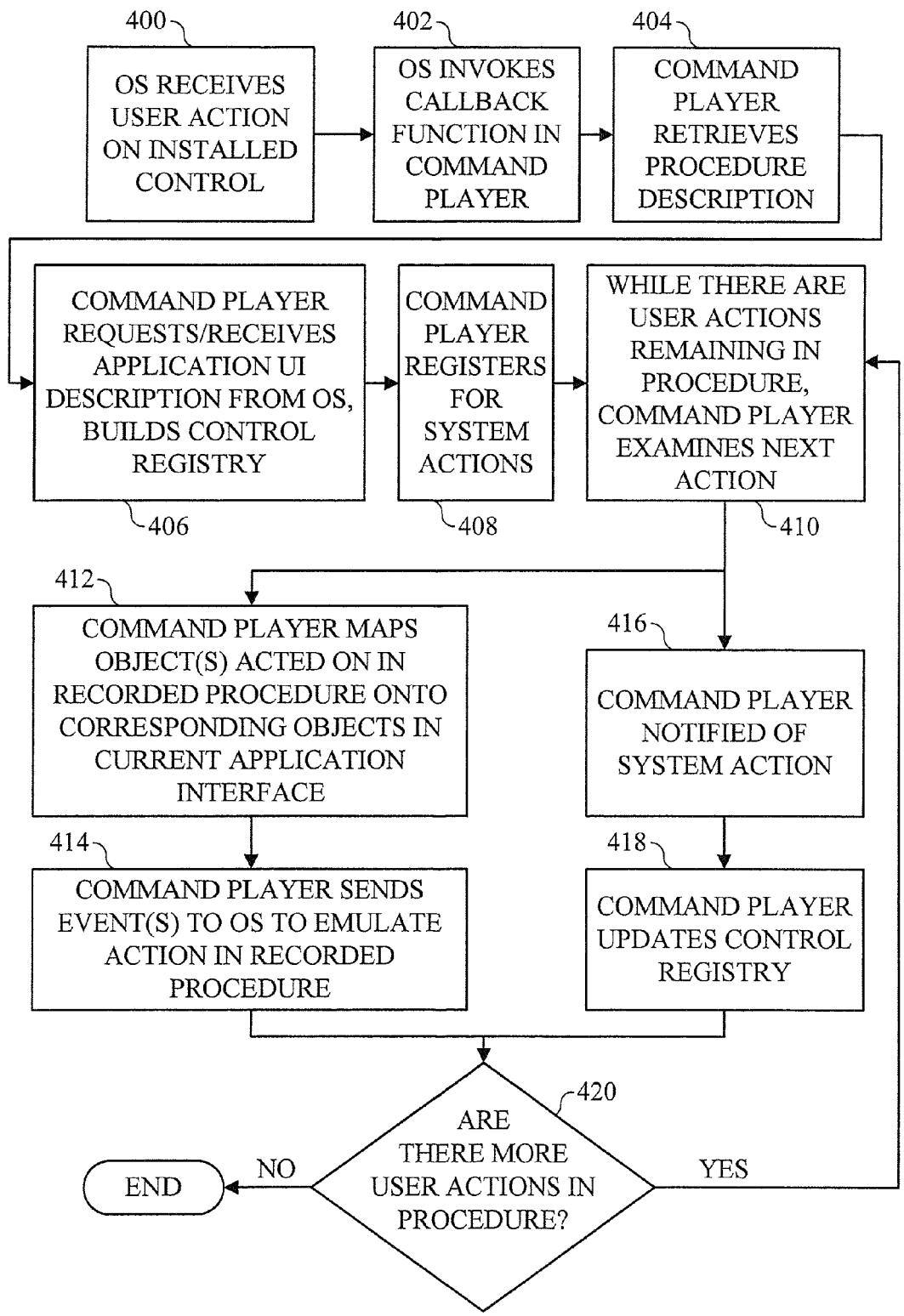
FIG. 4 is a flow diagram illustrating an activation and replay methodology for a procedure bound to a newly-created control, according to an embodiment of the present invention.

Referring now to FIG. 4, a flow diagram illustrates an activation and replay methodology for a procedure bound to a newly-created control, according to an embodiment of the present invention. This may be considered a detailed description of the interaction between user 100, operating system 104, application 102, and command player 112 of FIG. 1. When the control for the procedure is activated in step 400 by, for example, pressing a button or selecting a menu item (installed as described in FIG. 3), the command player receives the callback that has been bound to this control in step 402. The command player then retrieves the associated procedure description in step 404, requests and receives the application user-interface structure description from the operating system, and uses it to build a control registry in step 406. This is identical to step 200 in FIG. 2. The command player registers for system events in step 408. This is identical to the system event registration portion of step 202 in FIG. 2.

The methodology then enters an iterative loop at step 410 where actions remaining in a procedure are examined. The object on which the action is to be performed (e.g., a button, a menu item, etc.) is mapped in step 412 from the description stored in symbolic form in the procedure description, into corresponding objects in the application interface. Once the concrete object in the application interface has been determined, a message is sent to the operating system to emulate activation of that control in step 414.

In accordance with the invention, while the actions are being replayed, system events will typically be generated. If a system event, such as control creation, is received in step 416, the command player uses that information to update its control registry in step 418. Steps 416 and 418 may run in separate threads, with appropriate synchronization mechanisms implemented to prevent access conflicts on the control registry.

After each action is performed, a check is made to determine whether there are more actions in step 420. If there are more user actions in the procedure, the methodology returns to step 410. If there are no more user actions in the procedure, the methodology terminates.

In addition to adding new controls to an existing application, the inventive technique described herein can be used to alter the visible appearance of existing controls within an application. This kind of alteration of appearance is commonly known as "skinning." A set of alternate controls for existing operations can be created for any application. Underlying application controls may be invoked for the controls that are being reskinnned, by simulating the actions (e.g. Mouse click, key press) required to activate that control. Thus, it is possible to have a control that does not use a prerecorded procedure from the procedure repository, but simply passes the events to the operating system and application. For example, an overlay window may have a round button where the original application had a square button. When the round button is pressed by the user, the proxy simulates a press of the original square button.

A variety of techniques can be used to display the "skinned" controls. One possibility is to create an overlay window, which is spatially co-registered with the application window. Controls that are skinned can be rendered and the rest of the overall window can be transparent. Alternatively, the bitmap for the original application window may be copied and used to create a new window with the "skinned" portions redrawn. Using this technique, new user interfaces can be created that expose only a portion of the functionality of the application, or that add new controls as described above. Any individual control can have its functionality altered by mapping a new procedure to that control.

Another alternative is to provide an interface that allows the user to design new controls based on existing controls. The existing controls could be captured from the screen as bitmaps and then altered using standard drawing and painting operations. A final possibility is installation of program modules into the proxy that alter the visible appearance of the controls based on previous user actions or other events. For example, control A might be re-rendered in a different color to indicate unavailability whenever control B has been pressed.

Figure 5:
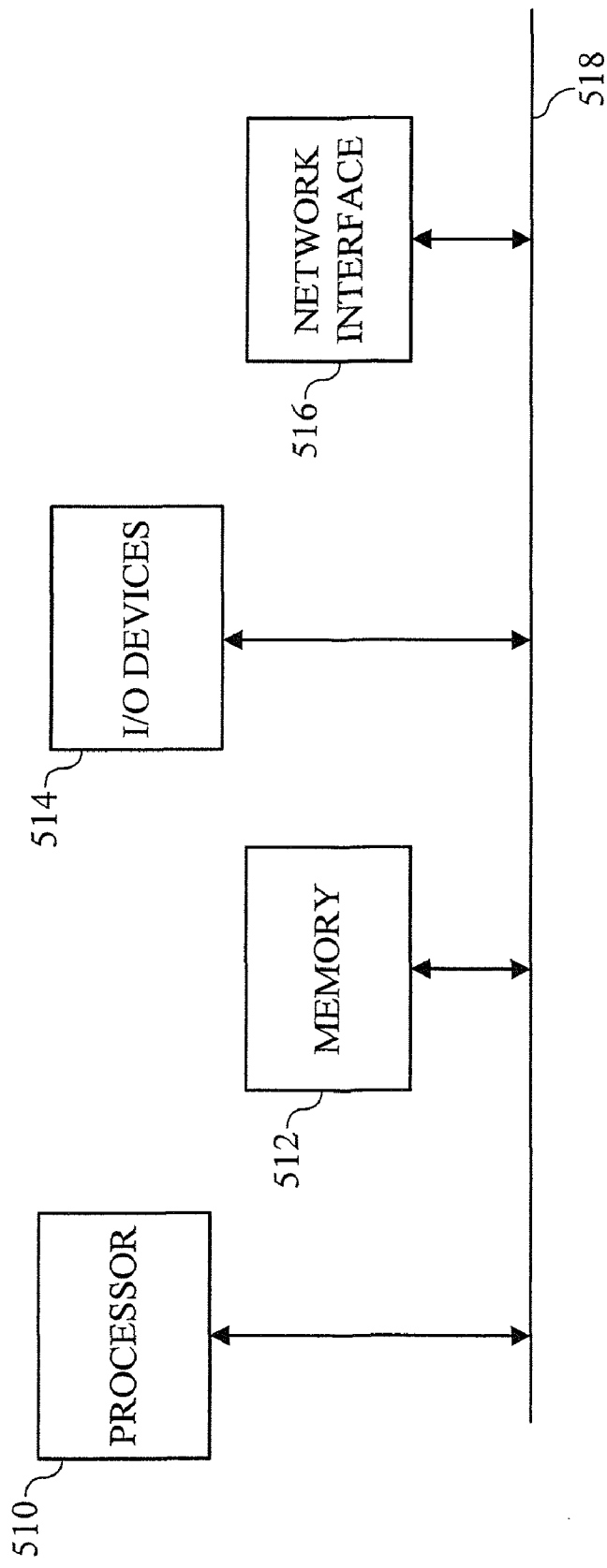
FIG. 5 is a diagram illustrating an illustrative hardware implementation of a computing system in accordance with which one or more components/methodologies of the present invention may be implemented, according to an embodiment of the present invention.

Referring now to FIG. 5, a block diagram illustrates an illustrative hardware implementation of a computing system in accordance with which one or more components/methodologies of the invention (e.g., components/methodologies described in the context of FIGS. 1 through 4) may be implemented, according to an embodiment of the present invention. For instance, such a computing system in FIG. 5 may implement application 102, operating system 104, procedure capturer 106, control installer 110 and command player 112 of FIG. 1.

It is to be understood that such individual components/methodologies may be implemented and processed on one such computer system, or on more than one such computer system. For instance, operating system 104 may be implemented on one computer system, while procedure capturer 106 may be implemented on another computer system. In the case of an implementation in a distributed computing system, the individual computer systems and/or devices may be connected via a suitable network, e.g., the Internet or World Wide Web. However, the system may be realized via private or local networks. The invention is not limited to any particular network.

As shown, the computer system may be implemented in accordance with a processor 510, a memory 512, I/O devices 514, and a network interface 516, coupled via a computer bus 518 or alternate connection arrangement.

It is to be appreciated that the term "processor," as used herein, is intended to include any processing device, such as, for example, one that includes a CPU (central processing unit) and/or other processing circuitry. It is also to be understood that the term "processor" may refer to more than one processing device and that various elements associated with a processing device may be shared by other processing devices.

The term "memory," as used herein, is intended to include memory associated with a processor or CPU, such as, for example, RAM, ROM, a fixed memory device (e.g., hard drive), a removable memory device (e.g., diskette), flash memory, etc.

In addition, the phrase "input/output devices" or "I/O devices," as used herein, is intended to include, for example, one or more input devices (e.g., keyboard, mouse, etc.) for entering data to the processing unit, and/or one or more output devices (e.g., speaker, display, etc.) for presenting results associated with the processing unit.

Still further, the phrase "network interface," as used herein, is intended to include, for example, one or more transceivers to permit the computer system to communicate with another computer system via an appropriate communications protocol (e.g., HTTP/S).

Software components including instructions or code for performing the methodologies described herein may be stored in one or more of the associated memory devices (e.g., ROM, fixed or removable memory) and, when ready to be utilized, loaded in part or in whole (e.g., into RAM) and executed by a CPU.

Accordingly, as described herein, the present invention provides techniques for altering application user-interface controls and, more particularly, for customizing a new or existing user-interface control in an application user-interface. The inventive techniques of the present invention are applicable to a large number of applications such as any in which new controls are desired to increase the functionality of the application.

Although illustrative embodiments of the present invention have been described herein with reference to the accompanying drawings, it is to be understood that the invention is not limited to those precise embodiments, and that various other changes and modifications may be made by one skilled in the art without departing from the scope or spirit of the invention.

What is claimed is:

1. A method executed by a processor for customizing a user-interface control of an existing application comprising the steps of:
   recording a procedure description comprising a series of actions performed by a user in the existing application user-interface; and
   in response to the recording step, customizing the control of the user-interface of the existing application by installing a user-interface control specific to the procedure description in the existing application for automatic execution of the procedure description and generation of the series of actions performed by the user when the user-interface control is activated.

2. The method of claim 1, wherein the procedure description comprises at least one user action.

3. The method of claim 2, wherein each user action comprises at least two lower-level user actions.

4. The method of claim 1, wherein the step of recording a procedure description performed by a user in the application user-interface comprises the steps of:
   transmitting at least one request for, application user-interface structure information from a procedure capturer to an operating system; and
   receiving the application user-interface structure information from the operating system at the procedure capturer.

5. The method of claim 4, further comprising the step of building a control registry at the procedure capturer based on the user-interface structure information.

6. The method of claim 5, wherein the step of recording a procedure description performed by the user in the application user-interface comprises the steps of:
   receiving a notification of a system action at the procedure capturer during a user action within the application interface; and
   updating the control registry of the procedure capturer.

7. The method of claim 1, wherein the step of recording a procedure description performed by the user in the application user-interface comprises the step of registering the procedure capturer with the operating system to receive notification of user actions and system actions.

8. The method of claim 1, wherein the step of recording a procedure description performed by the user in the application user-interface comprises the steps of:
   receiving notification of user action within the application interface at the procedure capturer;
   determining a result activated by user action at the procedure capturer;
   mapping the activated control into a generic description at the procedure capturer;
   adding the generic description to a procedure representation at the procedure capturer;
   determining if there are more user actions; and
   storing the procedure representation in the procedure capturer if there are no more user actions.

9. The method of claim 8, wherein the procedure representation is stored incrementally.

10. The method of claim 8, further comprising the step of receiving the procedure description at the control installer.

11. The method of claim 10, further comprising the step of modifying the procedure description at the control installer with details of the installed control.

12. The method of claim 1, wherein the step of installing the control relating to the procedure description in the existing application comprises the steps of:
   sending a request to an operating system from a control installer to install the control;
   creating and installing the control in the application user-interface through the operating system; and
   registering a callback at the operating system using a location supplied by the control installer.

13. The method of claim 1, further comprising the step of executing an installed control.

14. The method of claim 13, wherein the step of executing an installed control comprises the steps of:
   receiving a user action on the installed control at an operating system;

invoking a callback function in a command player by the operating system; and retrieving a procedure description at the command player.

15. The method of claim 13, wherein the step of executing an installed control comprises the steps of:

transmitting at least one request for application user-interface structure information from a command player to an operating system; and receiving the application user-interface structure information from the operating system at the command player.

16. The method of claim 13, wherein the step of executing an installed control comprises the step of building a control registry at a command player.

17. The method of claim 16, wherein the step of executing an installed control comprises the steps of:

notifying a command player of a system action;

updating a control registry at the command player; and determining if there are more user actions in a recorded procedure.

18. The method of claim 13, wherein the step of executing an installed control comprises the step of registering with an operating system for a command player to receive notification of user actions.

19. The method of claim 13, wherein the step of executing an installed control comprises the steps of:

examining a user action of a procedure at a command player;

mapping objects in recorded procedure onto corresponding objects in an application interface;

sending actions to an operating system from the command player to emulate action in the recorded procedure; and determining if there are more user actions in the recorded procedure.

20. The method of claim 1, wherein the step of installing the user-interface control comprises the step of altering the appearance of at least one existing user interface control.

21. The method of claim 20, wherein the step of altering the appearance of an existing user interface control comprises the steps of:

specifying the altered appearance of the at least one existing user interface control; and displaying the at least one altered user interface control.

22. The method of claim 21, wherein the at least one altered user interface control is displayed on top of the at least one existing user interface control.

23. The method of claim 21, wherein the at least one altered user interface control is displayed in a new window.

24. The method of claim 21, wherein the appearance of the at least one existing user interface control is altered using semi-transparent overlays.

25. The method of claim 21, wherein at least one application window is replaced by at least one new window, and wherein the at least one new window comprises a control corresponding to each control in the at least one application window.

26. The method of claim 21, wherein the appearance of the at least one altered user interface control is specified as an image file.

27. The method of claim 21, wherein the appearance of the at least one altered user interface control is specified by a program module that dynamically alters appearance based on a history of user actions.

* * * * *